United States Patent
Scheuring, III et al.

(10) Patent No.: US 6,848,545 B2
(45) Date of Patent: Feb. 1, 2005

(54) BRAKE ACTUATION ASSEMBLY FOR A VEHICLE

(75) Inventors: Joseph F. Scheuring, III, Newmarket (CA); Terry L. Reid, Alliston (CA); Michael R. Sykes, Orangeville (CA)

(73) Assignee: Ventra Group Inc., Bradford (CA)

( * ) Notice: Subject to any disclaimer, the term of this patent is extended or adjusted under 35 U.S.C. 154(b) by 0 days.

(21) Appl. No.: 10/627,997

(22) Filed: Jul. 28, 2003

(65) Prior Publication Data

US 2004/0094372 A1 May 20, 2004

Related U.S. Application Data

(60) Provisional application No. 60/399,441, filed on Jul. 31, 2002.

(51) Int. Cl.[7] .......................... F16D 65/36; F16D 55/08
(52) U.S. Cl. .......................... 188/2 D; 74/625; 192/34; 192/69.71; 192/219.6
(58) Field of Search .............................. 188/2 D, 106 P, 188/158, 160, 162, 196 BA, 196 D, 196 V; 74/512, 625; 192/34, 69.71, 219.4, 219.6, 83

(56) References Cited

U.S. PATENT DOCUMENTS

| | | |
|---|---|---|
| 2,245,958 A | 6/1941 | Barr et al. |
| 2,725,131 A | 11/1955 | Martin |
| 2,825,428 A | 3/1958 | Stiebinger |
| 2,835,353 A | 5/1958 | Brundage |
| 2,870,874 A | 1/1959 | Politte |
| 2,933,159 A | 4/1960 | Stiebinger |
| 2,959,261 A | 11/1960 | Hemphill |
| 3,236,121 A | 2/1966 | Gdowik et al. |
| 3,270,840 A | 9/1966 | Claire |
| 3,348,638 A | 10/1967 | Littmann |
| 3,353,634 A | 11/1967 | Farrar |
| 3,455,418 A | 7/1969 | Littmann |
| 3,481,434 A | 12/1969 | Evans |
| 3,516,519 A | 6/1970 | Besoyan |
| 3,539,038 A | 11/1970 | Taber et al. |

(List continued on next page.)

FOREIGN PATENT DOCUMENTS

| | | |
|---|---|---|
| DE | 196 53 961 A1 | 6/1998 |
| EP | 1 211 150 A2 | 6/2002 |
| GB | 2 248 280 A | 4/1992 |
| JP | 59-140153 | 8/1984 |
| JP | 5-139269 | 6/1993 |
| JP | 8-127317 | 5/1996 |
| WO | WO 02 20324 A1 | 3/2002 |

Primary Examiner—Chris Schwartz
(74) Attorney, Agent, or Firm—Pillsbury Winthrop LLP

(57) ABSTRACT

A brake actuation assembly for a vehicle is actuatable to apply and release tension to one or more elements that connect to a brake system of the vehicle. The brake actuation assembly includes an electrically powered brake actuator, a manually operable control, and a manual brake actuator. The electrically powered actuator includes a motor with a driveshaft for driving connection with the elements. The motor is actuatable to rotate the driveshaft in a brake-applying direction to apply tension to the elements and in a brake-releasing direction to release tension to the elements. The manual actuator includes a handle and a cable. The manual actuator is movable between an operative position wherein the cable connects the handle to the driveshaft to enable rotation of the handle to rotate the driveshaft in the brake-applying and brake-releasing directions via the cable, and an inoperative position wherein the handle is disconnected from the driveshaft.

14 Claims, 4 Drawing Sheets

U.S. PATENT DOCUMENTS

| | | | |
|---|---|---|---|
| 3,583,531 A | | 6/1971 | Besoyan |
| 3,593,815 A | | 7/1971 | Inoue |
| 3,638,766 A | * | 2/1972 | Besoyan ................. 188/106 P |
| 3,791,210 A | | 2/1974 | Taylor |
| 3,871,217 A | | 3/1975 | Miley |
| 3,875,820 A | | 4/1975 | Morden |
| 3,937,295 A | * | 2/1976 | Wright ....................... 180/271 |
| 3,938,406 A | | 2/1976 | Nisbet |
| 3,943,761 A | | 3/1976 | Shoberg et al. |
| 4,158,962 A | | 6/1979 | Conoval |
| 4,175,646 A | | 11/1979 | Eikelberger |
| 4,205,735 A | | 6/1980 | Murray |
| 4,245,139 A | | 1/1981 | Orscheln et al. |
| 4,265,110 A | | 5/1981 | Moulin |
| 4,271,718 A | | 6/1981 | Bopp et al. |
| 4,281,736 A | | 8/1981 | Lizzio |
| 4,318,308 A | | 3/1982 | Monteillet |
| 4,373,402 A | | 2/1983 | Barrett |
| 4,475,681 A | | 10/1984 | Ingle |
| 4,520,907 A | | 6/1985 | Sikora |
| 4,534,233 A | | 8/1985 | Hamaguchi |
| 4,561,527 A | * | 12/1985 | Nakamoto et al. ....... 192/219.4 |
| 4,569,489 A | | 2/1986 | Frey et al. |
| 4,629,043 A | * | 12/1986 | Matsuo et al. .............. 477/184 |
| 4,679,771 A | | 7/1987 | Johnson |
| 4,795,002 A | | 1/1989 | Burgei et al. |
| 4,817,463 A | | 4/1989 | Cameron |
| 4,850,242 A | | 7/1989 | Hass et al. |
| 4,850,459 A | | 7/1989 | Johannesen et al. |
| 4,865,165 A | | 9/1989 | Taig |
| 4,895,227 A | | 1/1990 | Grenier et al. |
| 4,991,699 A | | 2/1991 | Hiraiwa et al. |
| 5,000,297 A | | 3/1991 | Shaw et al. |
| 5,001,942 A | | 3/1991 | Boyer |
| 5,004,077 A | | 4/1991 | Carlson et al. |
| 5,024,299 A | | 6/1991 | Shaw et al. |
| 5,027,929 A | | 7/1991 | Ratke et al. |
| 5,029,681 A | | 7/1991 | Swiatek |
| 5,067,366 A | | 11/1991 | Gandiglio |
| 5,178,237 A | | 1/1993 | Ursel et al. |
| 5,180,038 A | * | 1/1993 | Arnold et al. .............. 188/171 |
| 5,219,049 A | | 6/1993 | Unterborn |
| 5,302,008 A | | 4/1994 | Miyake et al. |
| 5,310,026 A | | 5/1994 | Shaw et al. |
| 5,358,219 A | | 10/1994 | Shenk et al. |
| 5,542,513 A | | 8/1996 | Reyes |
| 5,555,773 A | | 9/1996 | Nanno et al. |
| 5,590,744 A | * | 1/1997 | Belmond ................... 188/265 |
| 5,667,282 A | | 9/1997 | Kim |
| 5,769,189 A | * | 6/1998 | Heibel et al. ............... 188/156 |
| 5,785,157 A | | 7/1998 | Scott et al. |
| 5,813,290 A | | 9/1998 | Takahashi et al. |
| 5,868,037 A | | 2/1999 | Pohling |
| 5,910,194 A | | 6/1999 | Cho |
| 5,950,783 A | | 9/1999 | Cahill |
| 5,970,814 A | | 10/1999 | Smith et al. |
| 5,983,745 A | | 11/1999 | Petrak |
| 6,019,436 A | | 2/2000 | Siepker |
| 6,139,117 A | | 10/2000 | Shirai et al. |
| 6,193,022 B1 | | 2/2001 | Bode |
| 6,213,259 B1 | | 4/2001 | Hanson et al. |
| 6,223,624 B1 | | 5/2001 | Iwanaga et al. |
| 6,244,394 B1 | | 6/2001 | Gutierrez et al. |
| 6,249,737 B1 | | 6/2001 | Zipp |
| 6,308,804 B1 | | 10/2001 | Roberts |
| 6,386,338 B1 | * | 5/2002 | Powrozek ................... 188/156 |
| 6,609,595 B2 | * | 8/2003 | Flynn et al. ................ 188/156 |
| 6,662,909 B2 | * | 12/2003 | Taniguchi ................... 188/162 |
| 6,755,284 B2 | * | 6/2004 | Revelis et al. .............. 188/2 D |
| 2001/0030093 A1 | | 10/2001 | Lundholm et al. |
| 2002/0003068 A1 | | 1/2002 | Sundqvist et al. |
| 2002/0174737 A1 | | 11/2002 | Revelis et al. |

\* cited by examiner

BRAKE ACTUATION ASSEMBLY FOR A VEHICLE

The present application claims priority to U.S. Provisional Application No. 60/399,441, filed Jul. 31, 2002, the entirety of which is hereby incorporated into the present application by reference.

FIELD OF THE INVENTION

The present invention relates to brake actuation assemblies for vehicles.

BACKGROUND OF THE INVENTION

Brake actuation assemblies having electrically powered brake actuators to electrically apply and release tension to a brake cable connected to the brake mechanisms are known in the art. A disadvantage of an electric brake actuator is that it cannot be actuated to apply and release the brake mechanisms when the vehicle is not powered due to a breakdown of the vehicle, for example. A malfunctioning electric brake actuator can also inhibit actuation of the brake mechanisms. Accordingly, it is known to provide a mechanism for manually applying and releasing the brake mechanisms in situations when the electric brake actuator cannot be actuated. Often, this manual applying and releasing mechanism is located outside of the passenger compartment, such as in the trunk of the vehicle, which requires that an occupant exit the vehicle in order to apply or release the brake mechanisms. This is inconvenient. Further, known manual applying and releasing mechanisms include separate tools for manually applying and releasing the brake mechanisms. With separate tools, some assembly is required, which further complicates operation of the manual applying and releasing mechanisms.

The present invention provides improvements over electric brake actuators having manual applying and releasing mechanisms.

SUMMARY OF THE INVENTION

One aspect of the invention relates to a brake actuation assembly for a vehicle including an electric brake actuator and a manual brake actuator. This aspect of the invention provides a brake actuation assembly for a vehicle that is actuatable to apply and release tension to one or more elements that connect to a brake system of the vehicle. The brake actuation assembly includes an electrically powered brake actuator, a manually operable control, and a manual brake actuator. The electrically powered brake actuator includes a reversible motor with a driveshaft for driving connection with the one or more elements. The reversible motor is actuatable to rotate the driveshaft in a brake-applying direction to apply tension to the one or more elements and in a brake-releasing direction opposite the brake-applying direction to release tension to the one or more elements. The manually operable control transmits a signal to the motor to selectively operate the motor. The manual brake actuator includes a rotatable handle and a flexible cable. The manual brake actuator is movable between (a) an operative position wherein the cable connects the handle to the driveshaft to enable rotation of the handle to rotate the driveshaft in the brake-applying and brake-releasing directions via the cable, and (b) an inoperative position wherein the handle is disconnected from the driveshaft.

Another aspect of the invention relates to a manual brake actuator for use with an electrically powered brake actuator of a vehicle. The electrically powered brake actuator includes a reversible motor with a driveshaft for driving connection with the one or more elements. The reversible motor is actuatable to rotate the driveshaft in a brake-applying direction to apply tension to the one or more elements and in a brake-releasing direction opposite the brake-applying direction to release tension to the one or more elements. The manual brake actuator includes a rotatable handle and a flexible cable. The manual brake actuator is movable between (a) an operative position wherein the cable connects the handle to the driveshaft to enable rotation of the handle to rotate the driveshaft in the brake-applying and brake-releasing directions via the cable, and (b) an inoperative position wherein the handle is disconnected from the driveshaft.

Other objects, features and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate understanding of the various embodiments of this invention. In such drawings.

DETAILED DESCRIPTION OF THE ILLUSTRATED EMBODIMENT

Figure 1:
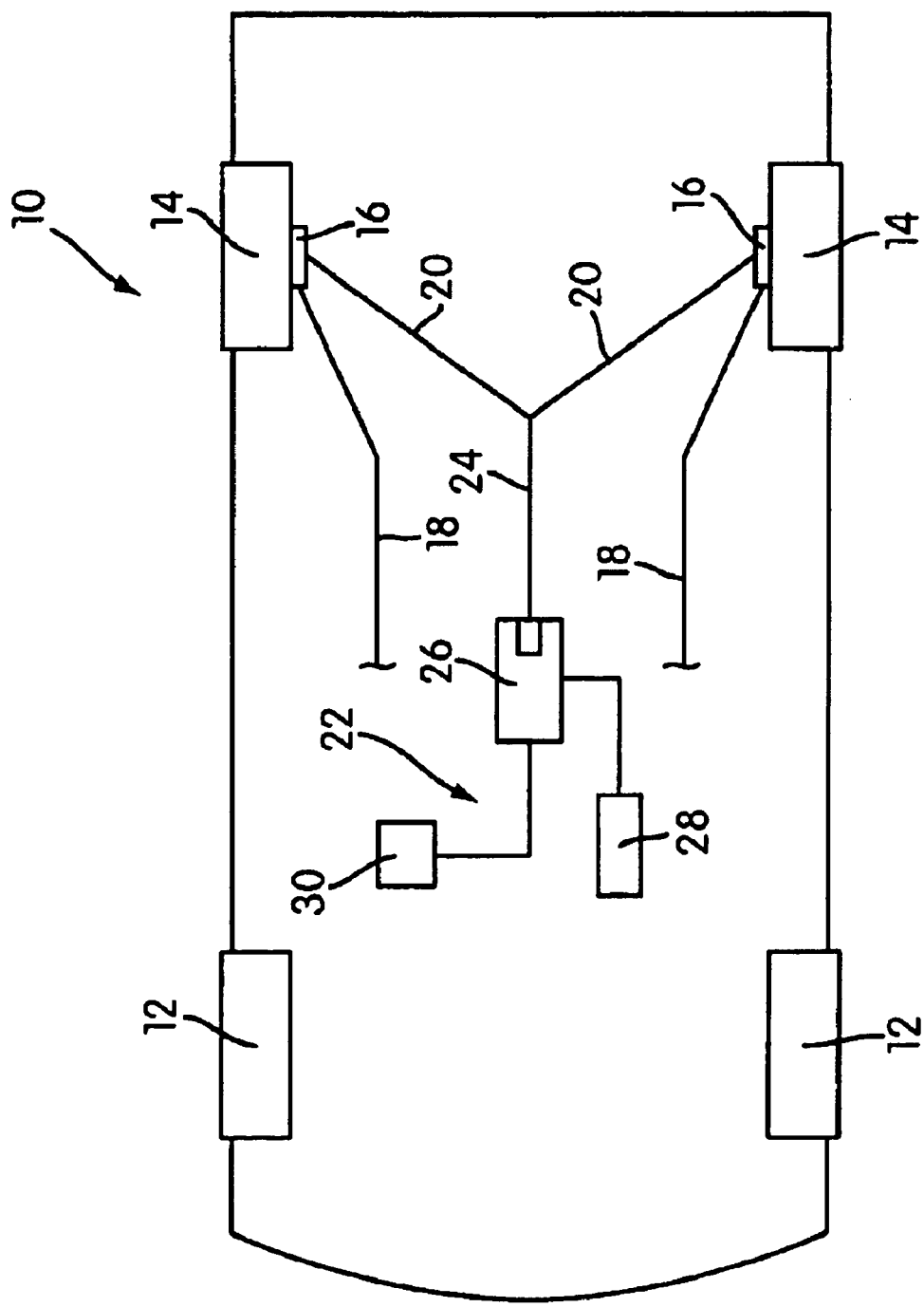
FIG. 1 is a schematic view of a vehicle illustrating the brake mechanisms and brake actuation assembly thereof.

FIG. 1 schematically illustrates a motor vehicle 10 having a pair of front wheel assemblies 12 and a pair of rear wheel assemblies 14. The rear wheel assemblies 14 each include a brake mechanism 16, which are operable to apply a braking force to the wheel assemblies 14 in order to slow and/or stop the vehicle 10 when in motion, or to prevent movement of the vehicle 10 when stopped. The brake mechanisms 16 are operable by a hydraulic brake assembly (not shown) via hydraulic lines 18, for example, when the vehicle 10 is under power. Alternatively, the brake mechanisms 16 are operable by a pair of linkages 20 coupled to a brake actuation assembly 22 via a connecting linkage 24. In the illustrated embodiment, the linkages 20, 24 are wire-strand brake cables. However, the linkages 20, 24 may be rigid linkages, such as rods.

The brake actuation assembly 22 is operable by an occupant of the vehicle 10, e.g., a driver, to pull the brake cables 20, 24 in a brake-applying direction towards a braking position wherein tension is supplied to the brake cables 20, 24 such that the brake mechanisms 16 apply the braking force to the wheel assemblies 14. Conversely, the brake actuation assembly 22 is operable by the occupant to push the brake cables 20, 24 in a brake-releasing direction opposite the brake-applying direction to a released position wherein tension in the brake cables 20, 24 is released such that the brake mechanisms 16 release the braking force to the wheel assemblies 14.

The brake actuation assembly 22 includes an electrically powered brake actuator 26 and a manual brake actuator 28 that are both accessible within the passenger compartment of the vehicle 10. The electrically powered brake actuator 26 is operable by an occupant of the vehicle 10 by an manually operable control 30 to apply and release tension to the brake cables 20, 24 when the vehicle 10 is under power. The control 30 transmits a signal to the electrically powered brake actuator 26 to operate the same. The manual brake actuator 28 is manually operable by an occupant of the vehicle 10 to apply and release tension to the brake cables 20, 24 when the vehicle 10 is not powered, due to a breakdown of the vehicle 10, for example. By providing both an electrically powered brake actuator 26 and a manual brake actuator 28, an occupant can either electrically or manually apply and release the brake mechanisms 16 without leaving the passenger compartment of the vehicle 10.

Figure 2:
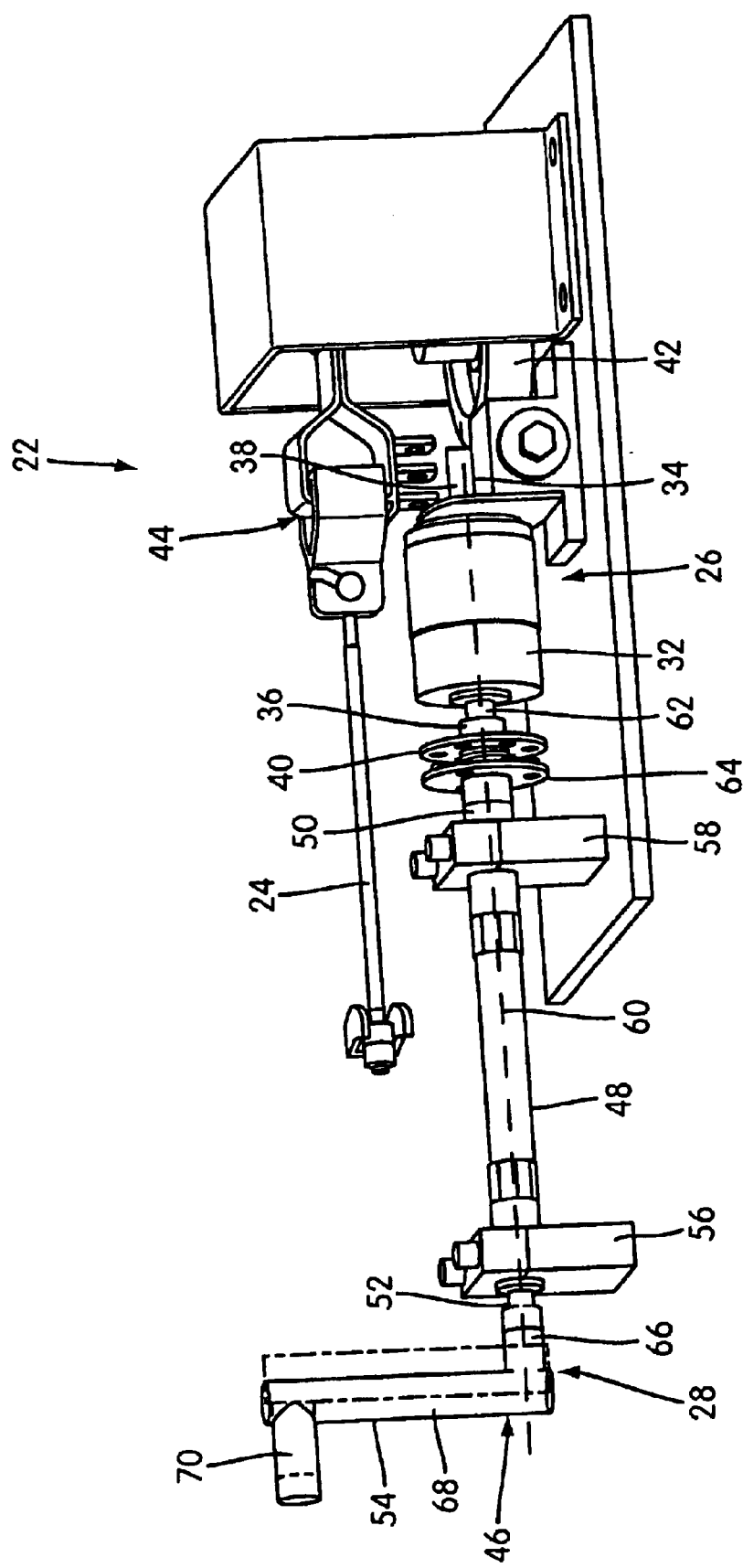
FIG. 2 is a perspective view of a brake actuation assembly constructed in accordance with the principles of the present invention.

As shown in FIG. 2, the electrically powered brake actuator 26 includes a reversible motor 32 that is operatively connected to the brake cable 24. More specifically, the motor 32 includes a driveshaft 34 having opposing longitudinal end portions 36, 38. One of the end portions 36 provides a first cooperating interlocking structure 40, as will be further discussed. The other of the end portions 38 is drivingly connected, through a series of gears (FIG. 2 shows one gear 42 from the series of gears), with an activation arm (not shown) connected to the brake cable 24.

The motor 32 is selectively actuatable to rotate in a brake-applying direction to rotate the activation arm so as to apply tension to the brake cable 24 and in a brake-releasing direction opposite the brake-applying direction to rotate the activation arm so as to release tension on the brake cable 24. Further details of operation and the components of the assembly that transfers torque from the driveshaft 34 of the motor 32 to the activation arm connected to the brake cable 24 are disclosed in U.S. patent application Ser. No. 10/153,288 to Revelis et al. entitled "Electrically Driven Parking Brake Actuation Assembly" filed on May 23, 2002, the entirety of which is hereby incorporated by reference into the present specification. The motor 32 may be drivingly interconnected with the brake cable 24 in any other suitable manner in order to apply and release tension to the brake cable 24. Further, the driveshaft 34 may comprise more than one shaft drivingly interconnected with one another wherein one of the shafts may include the first cooperating interlocking structure 40 and another of the shafts may be drivingly interconnected with the activation arm.

The motor 32 is connected to the control 30 that controls actuation of the motor 32. The control 30 includes a manual switch within the passenger compartment that is selectively actuated to signal the control 30 which transmits a signal to the motor to selectively operate the motor 32 in the brake-applying or brake-releasing directions. In the illustrated embodiment, a cable tension sensing device 44 is positioned between the brake cable 24 and the activation arm (not shown). The cable tension sensing device 44 controls the amount of tension being applied to the brake cables 20, 24 so that tension in the brake cables 20, 24 can be maintained between a predetermined minimum tension level and a predetermined maximum tension level. More specifically, the cable tension sensing device 44 is connected to the control 30 so that the motor 32 can be shut-off when tension in the brake cables 20, 24 has reached the predetermined minimum tension level or the predetermined maximum tension level. However, the cable tension sensing device 44 may be omitted such that the brake cable 24 is directly connected to the activation arm. The control 30 may be configured to control operation of the motor 32 based on other predetermined control criteria, such as motor resistance.

The manual brake actuator 28 includes a rotatable handle assembly 46. The rotatable handle assembly 46 includes a flexible drive cable 48 having opposing longitudinal end portions 50, 52 and a rotatable handle 54.

The drive cable 48 is flexible so that the drive cable 48 may be routed from a position adjacent the motor 32 to a position adjacent the passenger compartment of the vehicle, as will be further discussed. However, the drive cable 48 may be routed from a position adjacent the motor 32 to any other location on the vehicle such as the trunk of the vehicle, for example.

In the illustrated embodiment, the flexible drive cable 48 is rotatably and slidably supported by support members 56, 58 such that an axis 60 of the drive cable 48 is coaxial with an axis 62 of the driveshaft 34 of the motor 32. One of the end portions 50 provides a second cooperating interlocking structure 64, as will be further discussed. The other of the end portions 52 is connected to the rotatable handle 54. The flexible drive cable 48 may be supported within a drive tube. The drive tube would help to guide the drive cable 48 especially if it was routed such that the drive cable 48 had bends in it, as will be further discussed.

The rotatable handle 54 has a connecting portion 66 that is connected to the end portion 52 of the drive cable 48. The connecting portion 66 leads to a radially outwardly extending portion 68 which leads to a generally axially outwardly extending portion 70. The axially outwardly extending portion 70 is in the form of a handle portion such that manual rotation of the handle portion 70 rotates the drive cable 48 and hence the second cooperating interlocking structure 64 about the axis 60. The manual brake actuator 28 is mounted to a frame portion of the vehicle 10 such that the handle portion 70 extends into the passenger compartment of the vehicle 10. As a result, the handle portion 70 is easily accessible by an occupant within the vehicle 10. For example, the handle portion 70 may extend between the driver and passenger seats.

The flexible drive cable 48 allows the handle portion 70 to be positioned at any location within the vehicle. Specifically, after the electrically powered brake actuator 26 is mounted to the vehicle, the drive cable 48 may be routed from a position adjacent the motor 32 of the electrically powered brake actuator 26 to any position within the vehicle. The drive cable 48 may be bent and snaked around various components of the vehicle in order to position the end portion 52, to which the rotatable handle 54 connects, at the desired location within the vehicle. In the illustrated embodiment, the drive cable 48 requires no bends in order to route it to the desired location, i.e., the passenger compartment. Because of the versatility of the drive cable 48, the same brake actuation assembly 22 may be used for different vehicles. The path of the drive cable 48 would just need to adjusted accordingly in order to mount it within the vehicle.

Figure 3:
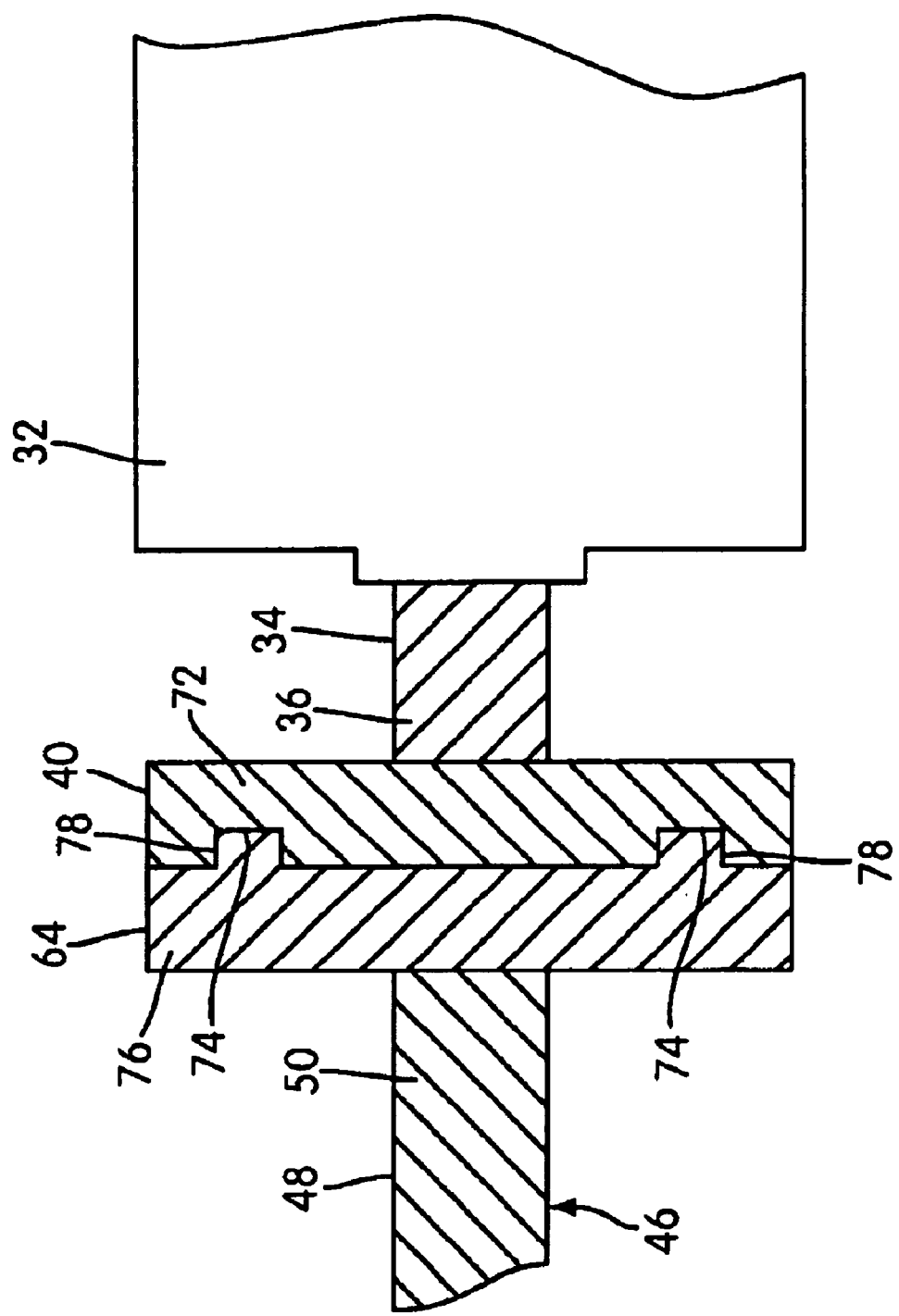
FIG. 3 is a cross-sectional view illustrating a portion of the brake actuation assembly with the manual brake actuator in the operative position.
Figure 4:
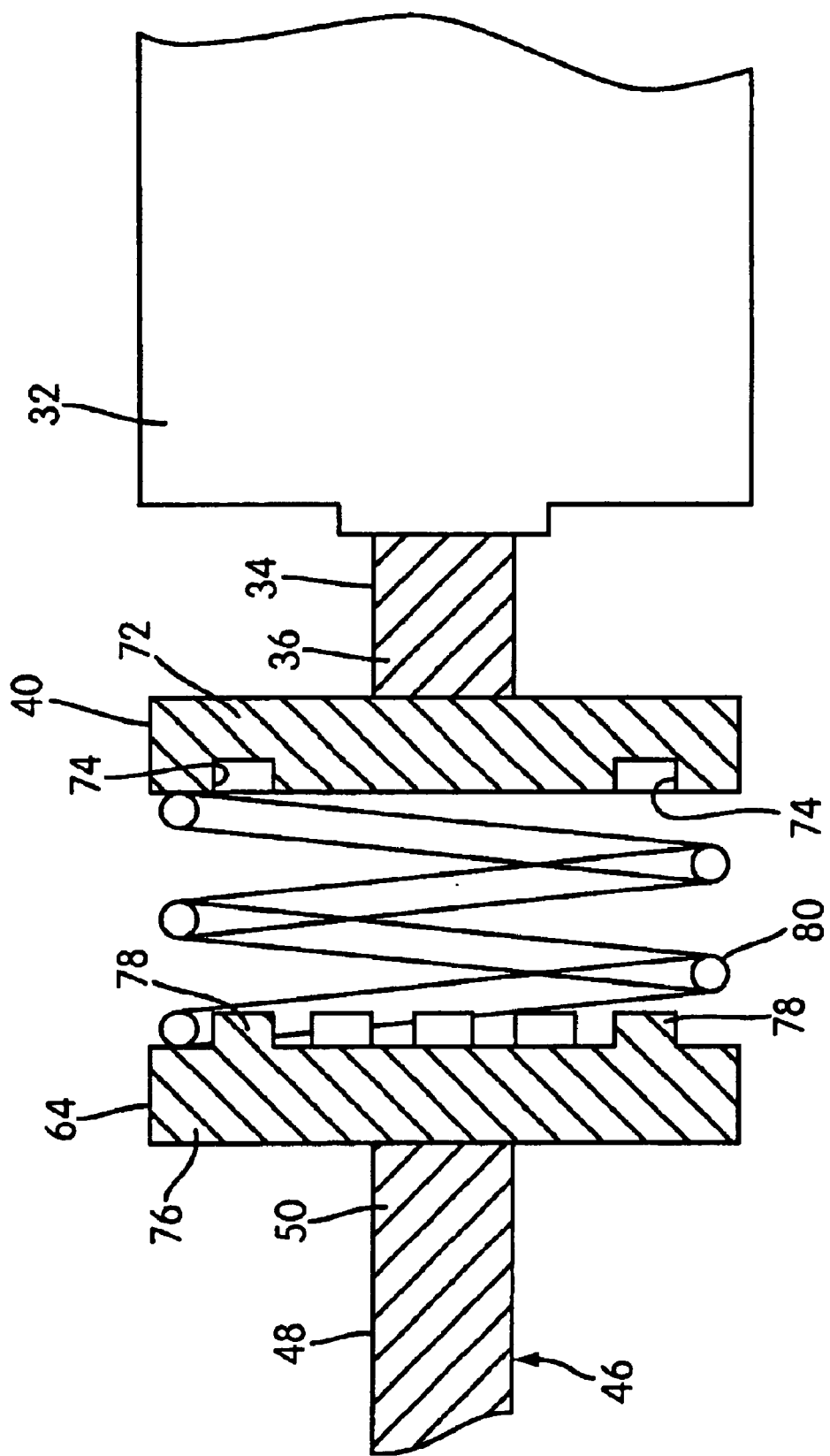
FIG. 4 is a cross-sectional view illustrating a portion of the brake actuation assembly with the manual brake actuator in the inoperative position.

The rotatable handle assembly 46 is selectively moveable between an operative or engaged position, as shown in FIG. 3 and an inoperative or disengaged position, as shown in FIG. 4. In the engaged position, the second cooperating interlocking structure 64 of the rotatable handle assembly 46 is engaged in rotational interlocking relationship with the first cooperating interlocking structure 40 of the motor 32 to manually rotate the same in the brake-applying and brake-releasing directions. In the disengaged position, the second cooperating interlocking structure 64 of the rotatable handle assembly 46 is spaced from the first cooperating interlocking structure 40 of the motor 32.

Specifically, as shown in FIG. 4, the first cooperating interlocking structure 40 includes a disk 72 that is connected to the end portion 36 of the driveshaft 34. The disk 72 includes a plurality of recesses 74. The second cooperating interlocking structure 64 includes a disk 76 that is connected to the end portion 50 of the drive cable 48. The disk 76 includes a plurality of protrusions 78. The number of recesses 74 within the disk 72 is greater than or equal to the number of protrusions 78 within the disk 76.

In the illustrated embodiment, the first and second cooperating interlocking structures 40, 64 are positioned adjacent the motor 32. However, the driveshaft 34 may be connected to a flexible cable such that the first and second cooperating interlocking structures 40, 64 may be positioned adjacent the rotatable handle 54 or may be positioned at an intermediate position between the rotatable handle 54 and the motor 32.

As shown in FIG. 4, a biasing structure 80, such as a spring, is positioned between the first and second cooperating interlocking structures 40, 64 so as to bias the first and second cooperating interlocking structures 40, 64 apart from another and hence bias the handle assembly 46 to the disengaged position. The biasing structure 80 may have any other configuration to bias the handle assembly 46 to the disengaged position. The handle assembly 46 is selectively movable to the engaged position against the biasing of the biasing structure 80, as shown in FIG. 3. Further, the biasing structure 80 may occupy any other suitable position to bias the first and second cooperating interlocking structures 40, 64 apart from another. For example, the biasing structure 80 may occupy a position between the handle 54 and the support member 56 so as to bias the handle 54 away from the support member 56 and hence bias the cable 48 and second cooperating interlocking structure 64 thereof away from the driveshaft 34 and first cooperating interlocking structure 40 thereof.

The support members 56, 58 slidably engage the drive cable 48 such that the drive cable 48 and hence the rotatable handle 54 is longitudinally movable in a first direction towards the engaged position and in a second direction towards the disengaged position. The handle assembly 46 is maintained in the disengaged position by the biasing structure 80. Like a Bowden wire assembly, the drive cable 48 may be positioned within a drive tube to facilitate the longitudinal movement of the drive cable 48 and prevent flexing or bending of the drive cable 48 during the longitudinal movement. If the drive cable is routed such that it has a series of bends, a drive tube should be provided to guide movement of the drive cable between the engaged and disengaged positions.

When the handle 54 is longitudinally moved towards the engaged position against the biasing of the biasing structure 80, the longitudinal movement is transmitted to the drive cable 48 which moves the second cooperating interlocking structure 64 thereof into rotational interlocking engagement with the first cooperating interlocking structure 40 of the motor 32. More specifically, the plurality of protrusions 78 of the second cooperating interlocking structure 64 are received within the plurality of recesses 74 of the first cooperating interlocking structure 40 when the handle assembly 46 is moved to the engaged position to thereby rotationally interlock the first and second cooperating interlocking structures 40, 64, as shown in FIG. 3. The first and second cooperating interlocking structures 40, 64 may have any other configuration to provide a rotational interlocking relationship when engaged with one another. For example, the first and second cooperating interlocking structures 40, 64 may each have a series of gear teeth that are intermeshed with one another when the first and second cooperating interlocking structures 40, 64 are engaged with one another.

As a result, rotational movement of the drive cable 48 by the handle 54 is transmitted to the driveshaft 34 of the motor 32 by the interlocked first and second cooperating interlocking structures 40, 64. Thus, rotation of the handle 54 in one direction rotates the driveshaft 34 in a brake-applying direction to apply tension to the brake cable 24 and rotation of the handle 54 in the opposite direction rotates the driveshaft 34 in a brake-releasing direction to release tension on the brake cable 24. When the handle assembly 46 is in the disengaged position (FIG. 4), the first cooperating interlocking structure 40 is spaced or disconnected from the second cooperating interlocking structure 64 such that rotation of the driveshaft 34 is controlled by the motor 32. Consequently, tension in the brake cable 24 may only be manually applied and released by both maintaining the handle assembly 46 in the engaged position and rotating the handle assembly 46 to rotate the driveshaft 34 in the brake-applying and brake-releasing directions.

Thus, when the vehicle 10 is powered, an occupant may apply or release the brake mechanisms 16 by actuating the manual switch within the passenger compartment to signal the control assembly 30 to operate the motor 32 in the brake-applying or brake-releasing directions. If the occupant needs to manually apply or release the brake mechanisms 16 due to a breakdown of the vehicle 10, for example, an occupant should move the handle assembly 46 to the engaged position (FIG. 3) to rotational interlock the first and second cooperating interlocking structures 40, 64 and rotate the handle assembly 46 to rotate the driveshaft 34 in the brake-applying and brake-releasing directions. Thus, an occupant may actuate the brake mechanisms 16 of the vehicle 10 without leaving the passenger's compartment, regardless of the operational condition of the vehicle 10.

The manual brake actuator 28 is preferably provided for use with an electric brake actuator 26 of a vehicle 10 for manually rotating the motor 32 that actuates the brake mechanisms 16. However, the mechanism 28 may also be used to manually actuate other motorized options in a vehicle in case of emergency. For example, the mechanism 28 may be utilized to manually actuate motorized headlights, retractable running boards, motorized locks, motorized windows, adjustable pedals, and motorized seats.

It can thus be appreciated that the objectives of the present invention have been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A brake actuation assembly for a vehicle, the brake actuation assembly being actuatable to apply and release tension to one or more elements that connect to a brake system of the vehicle, the brake actuation assembly comprising:

an electrically powered brake actuator including a reversible motor with a driveshaft for driving connection with the one or more elements, the reversible motor being actuatable to rotate the driveshaft in a brake-applying direction to apply tension to the one or more elements and in a brake-releasing direction opposite the brake-applying direction to release tension to the one or more elements;

a manually operable control for transmitting a signal to the motor to selectively operate the motor; and a manual brake actuator including a rotatable input member and a flexible cable, the manual brake actuator being movable between (a) an operative position wherein the cable connects the input member to the driveshaft to enable rotation of the input member to rotate the driveshaft in the brake-applying and brake-releasing directions via the cable, and (b) an inoperative position wherein the input member is disconnected from the driveshaft;

wherein the driveshaft of the motor includes a first cooperating interlocking structure and the cable has a second cooperating interlocking structure, the manual brake actuator being movable between the operative position wherein the second cooperating structure of the cable is engaged in rotational interlocking relationship with the first cooperating interlocking structure of the reversible motor to enable the rotation of the driveshaft by the input member and the inoperative position wherein the second cooperating interlocking structure is disengaged from the first cooperating interlocking structure.

2. The brake actuation assembly according to claim 1, wherein one of the first and second cooperating interlocking structures includes a plurality of protrusions and the other of the first and second cooperating interlocking structures includes a plurality of recesses that is greater than or equal to a number of protrusions included in the one of the first and second cooperating interlocking structures, the plurality of protrusions being received within the plurality of recess when the manual brake actuator is moved to the operative position to thereby rotationally interlock the first and second cooperating interlocking structures.

3. The brake actuator assembly according to claim 2, wherein the input member is a handle.

4. The brake actuation assembly according to claim 1, wherein at least one of the elements is a cable.

5. The brake actuation assembly according to claim 1, wherein the flexible cable is routable from a position adjacent the motor to a position adjacent a passenger compartment of the vehicle.

6. The brake actuation assembly according to claim 1, further comprising a biasing structure to bias the manual brake actuator to the inoperative position, the manual brake actuator being movable to the operative position against the biasing of the biasing structure.

7. The brake actuation assembly according to claim 1, further comprising a cable tension sensing unit configured and positioned to control a level of tension being applied to the one or more elements.

8. The brake actuator assembly according to claim 1, wherein the input member is a handle.

9. A manual brake actuator for use with an electrically powered brake actuator of a vehicle, the electrically powered brake actuator including a reversible motor with a driveshaft for driving connection with the one or more elements, the reversible motor being actuatable to rotate the driveshaft in a brake-applying direction to apply tension to the one or more elements and in a brake-releasing direction opposite the brake-applying direction to release tension to the one or more elements, the manual brake actuator comprising:

a rotatable input member; and a flexible cable, the manual brake actuator being movable between (a) an operative position wherein the cable connects the input member to the driveshaft to enable rotation of the input member to rotate the driveshaft in the brake-applying and brake-releasing directions via the cable, and (b) an inoperative position wherein the input member is disconnected from the driveshaft;

wherein the driveshaft of the motor includes a first cooperating interlocking structure and the cable has a second cooperating interlocking structure, the manual brake actuator being movable between the operative position wherein the second cooperating structure of the cable is engaged in rotational interlocking relationship with the first cooperating interlocking structure of the reversible motor to enable the rotation of the driveshaft by the handle input member and the inoperative position wherein the second cooperating interlocking structure is disengaged from the first cooperating interlocking structure.

10. The manual brake actuator according to claim 9, wherein one of the first and second cooperating interlocking structures includes a plurality of protrusions and the other of the first and second cooperating interlocking structures includes a plurality of recesses that is greater than or equal to a number of protrusions included in the one of the first and second cooperating interlocking structures, the plurality of protrusions being received within the plurality of recess when the manual brake actuator is moved to the operative position to thereby rotationally interlock the first and second cooperating interlocking structures.

11. The manual brake actuator according to claim 10, wherein the input member is a handle.

12. The manual brake actuator according to claim 9, wherein the flexible cable is routable from a position adjacent the motor to a position adjacent a passenger compartment of the vehicle.

13. The manual brake actuator according to claim 9, further comprising a biasing structure to bias the manual brake actuator to the inoperative position, the manual brake actuator being movable to the operative position against the biasing of the biasing structure.

14. The manual brake actuator according to claim 9, wherein the input member is a handle.

* * * * *